US010626894B2

(12) United States Patent
Takahashi

(10) Patent No.: US 10,626,894 B2
(45) Date of Patent: Apr. 21, 2020

(54) FLUID PRESSURE CYLINDER AND MANUFACTURING METHOD THEREOF

(71) Applicant: KYB Corporation, Tokyo (JP)

(72) Inventor: Yusuke Takahashi, Gifu (JP)

(73) Assignee: KYB Corporation, Tokyo (JP)

( * ) Notice: Subject to any disclaimer, the term of this patent is extended or adjusted under 35 U.S.C. 154(b) by 161 days.

(21) Appl. No.: 15/740,586

(22) PCT Filed: Jun. 22, 2016

(86) PCT No.: PCT/JP2016/068547
§ 371 (c)(1),
(2) Date: Dec. 28, 2017

(87) PCT Pub. No.: WO2017/002687
PCT Pub. Date: Jan. 5, 2017

(65) Prior Publication Data
US 2018/0195536 A1 Jul. 12, 2018

(30) Foreign Application Priority Data

Jul. 2, 2015 (JP) .................................. 2015-133752

(51) Int. Cl.
*F15B 15/28* (2006.01)
*G01D 5/48* (2006.01)

(52) U.S. Cl.
CPC ...... *F15B 15/2815* (2013.01); *F15B 15/2861* (2013.01); *F15B 15/2892* (2013.01); *G01D 5/485* (2013.01)

(58) Field of Classification Search
CPC ... F15B 15/28; F15B 15/2815; F15B 15/2853
See application file for complete search history.

(56) References Cited

U.S. PATENT DOCUMENTS

| | | | |
|---|---|---|---|
| 4,523,514 A * | 6/1985 | Burk | F15B 15/2853 338/176 |
| 6,509,733 B2 | 1/2003 | Blubaugh et al. | |
| 6,512,360 B1 * | 1/2003 | Goto | G01D 3/0365 324/120 |
| 8,100,045 B2 * | 1/2012 | Osborn | F15B 15/2815 91/1 |

FOREIGN PATENT DOCUMENTS

| | | | |
|---|---|---|---|
| CN | 102943785 A * | 2/2013 | .............. F16B 15/14 |
| CN | 102943785 A | 2/2013 | |
| FR | 2794236 A1 * | 12/2000 | .......... F15B 15/2892 |
| GB | 2117828 A * | 10/1983 | .......... F15B 15/2853 |

\* cited by examiner

*Primary Examiner* — Thomas E Lazo
*Assistant Examiner* — Matthew Wiblin
(74) *Attorney, Agent, or Firm* — Rabin & Berdo, P.C.

(57) ABSTRACT

A manufacturing method of a fluid pressure cylinder includes inserting the sensor rod into a hole extending in the piston rod, holding the sensor body with respect to the piston rod by using a holding member mounted on the piston rod, inserting the piston rod into the cylinder tube, and fixing the sensor body to the cylinder tube by fixing the holding member to the cylinder tube.

11 Claims, 9 Drawing Sheets

FLUID PRESSURE CYLINDER AND MANUFACTURING METHOD THEREOF

TECHNICAL FIELD

The present invention relates to a fluid pressure cylinder including a position sensor and a manufacturing method thereof.

BACKGROUND ART

U.S. Pat. No. 6,509,733B2 discloses a fluid pressure cylinder including a position sensor that detects a relative position of a piston rod with respect to a cylinder tube.

The position sensor of this fluid pressure cylinder has a sensor body fixed to the cylinder tube and a sensor rod extending along an axial direction of the cylinder tube from the sensor body. In the piston rod, a hole that extends along an axial direction of the piston rod is formed, and the sensor rod is movably inserted in that hole.

SUMMARY OF INVENTION

In order to manufacture a fluid pressure cylinder disclosed in U.S. Pat. No. 6,509,733B2, first, the sensor body is fixed to the cylinder tube, and the sensor rod extends along an axial direction of the cylinder tube from the sensor body. After that, the piston rod is inserted into the cylinder tube so that the sensor rod is inserted into the hole in the piston rod.

In this manufacturing method, when the piston rod is inserted into the cylinder tube, an axis of the cylinder tube needs to be matched with a vertical direction. That is for a reason that, in a state where the axis of the cylinder tube is inclined with respect to the vertical direction, the sensor rod is influenced by a gravitational force, an axis of the sensor rod does not match an axis of the hole in the piston rod, and it becomes difficult to insert the sensor rod in the hole of the piston rod.

As described above, in the fluid pressure cylinder disclosed in U.S. Pat. No. 6,509,733B2, directions of the cylinder tube and the piston rod are limited when the piston rod is inserted into the cylinder tube.

The present invention has an object to provide a fluid pressure cylinder capable of assembling by inserting the piston rod into the cylinder tube without limitation on the directions of the cylinder tube and the piston rod and the manufacturing method thereof.

According to one aspect of the present invention, a fluid pressure cylinder includes a position sensor configured to detect a relative position of a piston rod with respect to a cylinder tube, the position sensor has a sensor body and a sensor rod extending from the sensor body. A manufacturing method of the fluid pressure cylinder includes inserting the sensor rod into a hole extending in the piston rod along an axial direction of the piston rod, holding the sensor body with respect to the piston rod by using a holding member mounted on the piston rod, inserting the piston rod with the sensor body into the cylinder tube, and fixing the sensor body to the cylinder tube by fixing the holding member to the cylinder tube.

DESCRIPTION OF EMBODIMENTS

Embodiments of the present invention will be described below by referring to the attached drawings. Here, a double-acting type hydraulic cylinder (fluid pressure cylinder) will be described, but this embodiment can be also applied to a single-acting type hydraulic cylinder. Moreover, a working oil is used as a working fluid, here, but other fluids such as a working water or the like may be also used as the working fluid.

<First Embodiment>

First, by referring to FIGS. 1 to 6, a hydraulic cylinder 100 according to a first embodiment of the present invention will be described.

Figure 1:
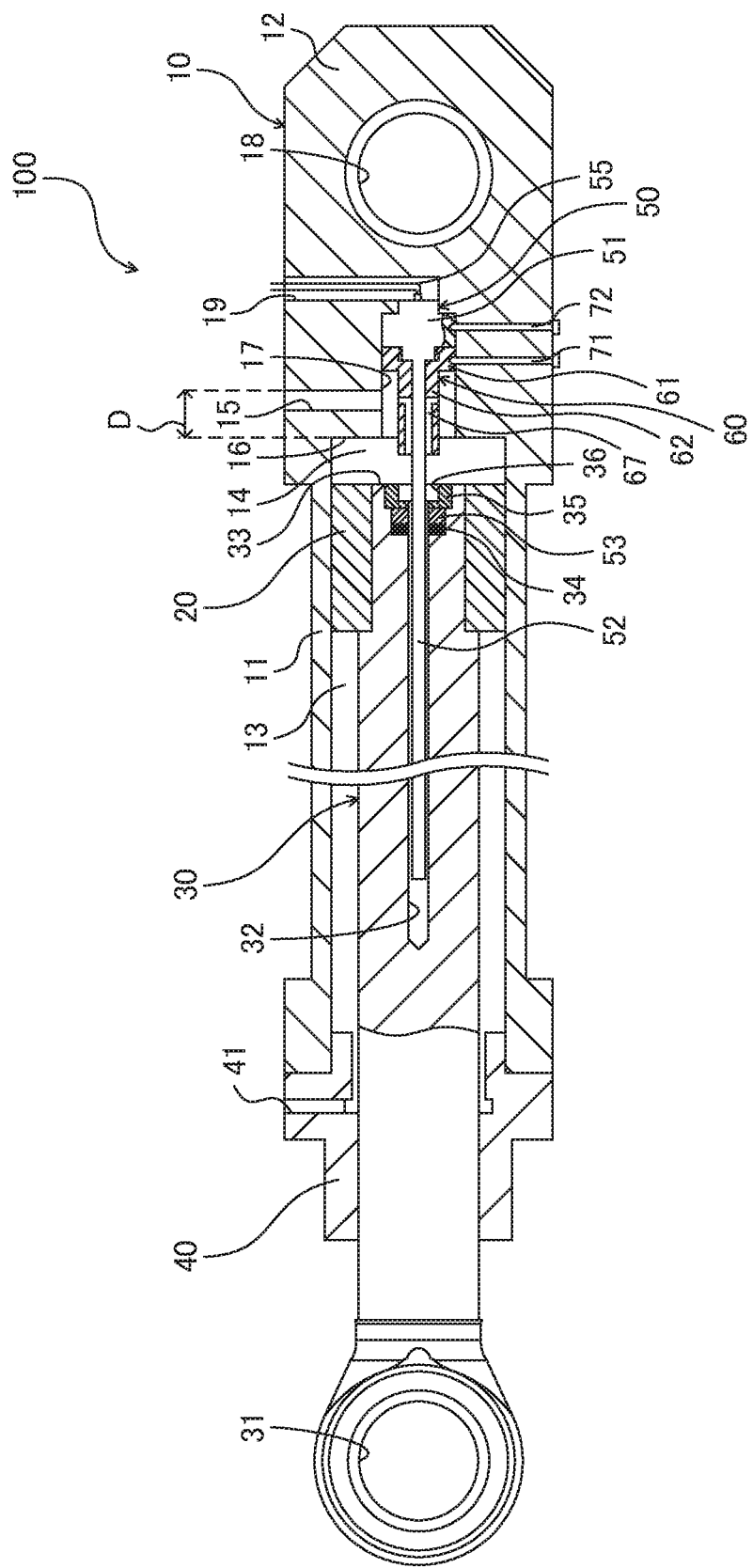
FIG. 1 is a sectional view of a fluid pressure cylinder according to a first embodiment of the present invention.

FIG. 1 is a sectional view of the hydraulic cylinder 100 according to this embodiment. As illustrated in FIG. 1, the hydraulic cylinder 100 includes a cylinder tube 10, a piston 20 slidably accommodated in the cylinder tube 10, and a piston rod 30 coupled with the piston 20 and movably inserted into the cylinder tube 10.

The cylinder tube 10 has a cylindrical tube 11 and a cylinder bottom 12 provided on one end of the tube 11. In an opening on the other end of the tube 11, a cylinder head 40 is fitted. The cylinder bottom 12 closes one of openings of the tube 11, while the cylinder head 40 closes the other opening of the tube 11. In the following, the other opening of the tube 11 is also called as "head-side opening".

The piston rod 30 extends along an axis of the cylinder tube 10 from the piston 20 and protrudes from the cylinder tube 10 through the head-side opening. The cylinder head 40 slidably supports the piston rod 30.

An inside of the cylinder tube 10 is divided by the piston 20 into a rod-side chamber 13 on the cylinder head 40 side and an anti-rod side chamber 14 on the cylinder bottom 12 side. The rod side chamber 13 communicates with a head-side supply-discharge passage 41 formed in the cylinder head 40, while the anti-rod side chamber 14 communicates with a bottom-side supply-discharge passage 15 formed in the cylinder bottom 12.

The cylinder bottom 12 has a limiting surface 16 that limits movement of the piston rod 30 in an axial direction of the cylinder tube 10 and a hole (second hole) 17 extending in the axial direction of the cylinder tube 10 from the limiting surface 16. The limiting surface 16 also functions as a wall surface of the anti-rod side chamber 14. The bottom-side supply-discharge passage 15 opens in an inner peripheral surface of the hole 17. That is, the hole 17 functions as a part of the anti-rod side chamber 14. The opening in the bottom-side supply-discharge passage 15 located on the inner peripheral surface of the hole 17 is separated away from the limiting surface 16 in the axial direction of the cylinder tube 10 only by a predetermined distance D.

When the working oil is supplied to the rod-side chamber 13 through the head-side supply-discharge passage 41, the piston 20 and the piston rod 30 are moved to the cylinder bottom 12 side, and the hydraulic cylinder 100 is contracted. At this time, the working oil in the anti-rod side chamber 14 is discharged from the hydraulic cylinder 100 through the bottom-side supply-discharge passage 15.

When the working oil is supplied to the anti-rod side chamber 14 through the bottom-side supply-discharge passage 15, the piston 20 and the piston rod 30 are moved to the cylinder head 40 side, and the hydraulic cylinder 100 extends. At this time, the working oil in the rod side chamber 13 is discharged from the hydraulic cylinder 100 through the head-side supply-discharge passage 41.

The cylinder bottom 12 is provided with a pin hole 18 penetrating in a direction orthogonal to the axis of the cylinder tube 10. Moreover, the piston rod 30 is provided with, on a side of opposite to the piston 20, a pin hole 31 that penetrates in a direction orthogonal to the axis of the piston rod 30.

The pin holes 18 and 31 are used for coupling with a device on which the hydraulic cylinder 100 is mounted. When the hydraulic cylinder 100 is mounted on a boom of a hydraulic excavator, for example, the boom can be elevated up/down in accordance with an extending/contracting of the hydraulic cylinder 100.

Moreover, the hydraulic cylinder 100 includes a position sensor 50 that detects a relative position of the piston rod 30 with respect to the cylinder tube 10 and a holding member 60 that holds the position sensor 50 in the cylinder tube 10. The holding member 60 is fixed to the hole 17 in the cylinder bottom 12 by a fastening member 71.

The position sensor 50 has a sensor body 51 fitted in the hole 17 in the cylinder bottom 12, a sensor rod 52 extending along the axial direction of the cylinder tube 10 from the sensor body 51, and an annular magnet 53 provided on the piston rod 30. The sensor body 51 is disposed on a bottom side closer to the hole 17 than the opening of the bottom-side supply-discharge passage 15 located on the inner peripheral surface of the hole 17 so as not to close the bottom-side supply-discharge passage 15. In the following, the hole 17 is also called the "sensor body hole 17".

In this embodiment, the sensor body 51 is disposed at a position exceeding the predetermined distance D in the axial direction of the cylinder tube 10 from the limiting surface 16.

Figure 2:
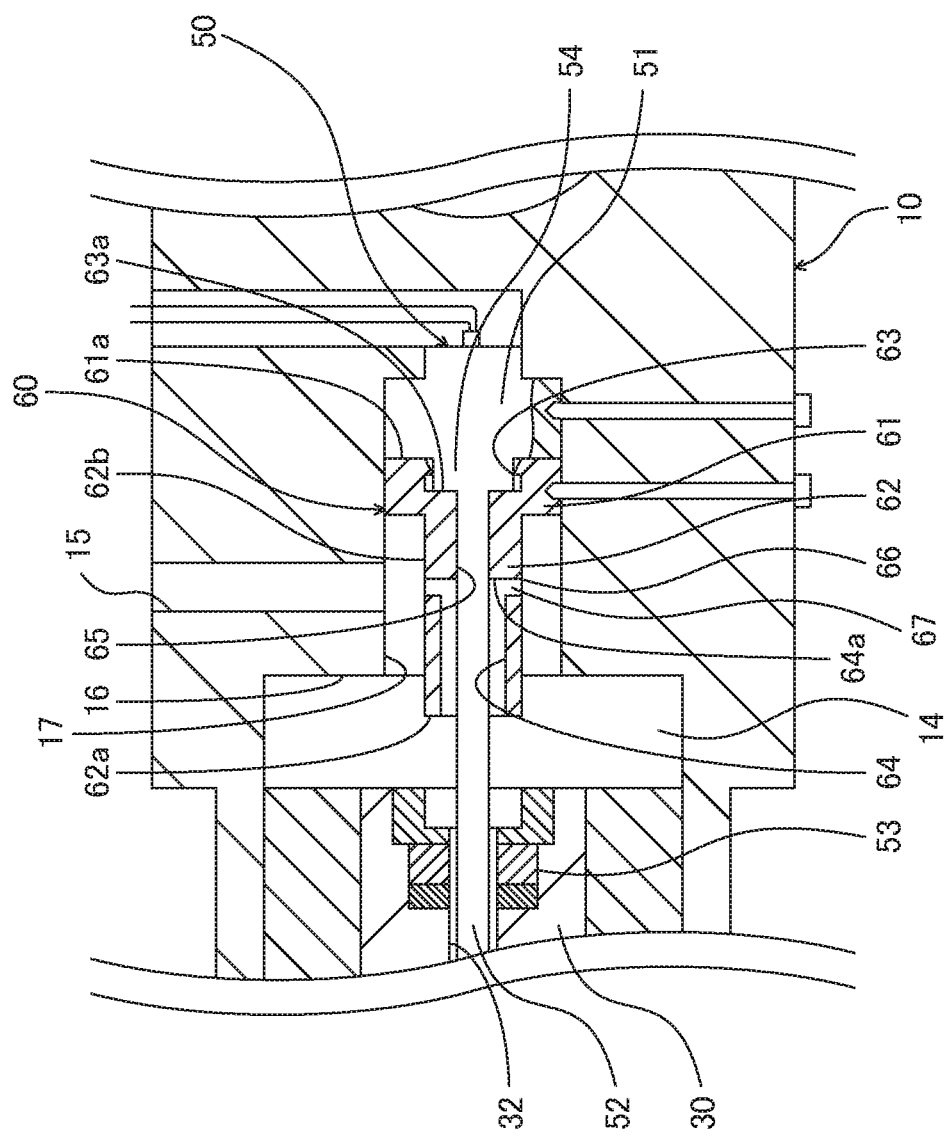
FIG. 2 is an enlarged sectional view illustrating a periphery of a sensor body and a holding member.

FIG. 2 is an enlarged sectional view illustrating a periphery of the sensor body 51 and the holding member 60. As illustrated in FIG. 2, the holding member 60 has a large-diameter portion 61 and a small-diameter portion 62 having an outer diameter smaller than an outer diameter of the large-diameter portion 61.

The outer diameter of the large-diameter portion 61 and an inner diameter of the sensor body hole 17 are substantially the same, and the large-diameter portion 61 is fitted in the sensor body hole 17. The large-diameter portion 61 is disposed on the bottom side of the sensor body hole 17 rather than the opening of the bottom-side supply-discharge passage 15 so as not to close the bottom-side supply-discharge passage 15.

The large-diameter portion 61 is located closer to the cylinder head 40 (see FIG. 1) side than the sensor body 51. On an end surface 61a of the large-diameter portion 61 on the sensor body 51 side, a recess portion 63 is formed. The sensor body 51 is provided with a projecting portion 54 protruding to the large-diameter portion 61 side, and an outer diameter of the projecting portion 54 and an inner diameter of the recess portion 63 are substantially equal.

When the projecting portion 54 of the sensor body 51 is fitted in the recess portion 63 in the large-diameter portion 61, the sensor body 51 is held by the large-diameter portion 61. When the large-diameter portion 61, which is holding the sensor body 51, is fixed to the cylinder bottom 12, the position sensor 50 is held by the holding member 60 in the cylinder tube 10.

The small-diameter portion 62 is located closer to the cylinder head 40 side than the large-diameter portion 61. A dimension of the small-diameter portion 62 in the axial direction of the cylinder tube 10 is longer than a distance from the limiting surface 16 to the large-diameter portion 61, and a part of the small-diameter portion 62 protrudes from the sensor body hole 17.

On an end surface 62a of the small-diameter portion 62 on the cylinder head 40 (see FIG. 1) side, a recess portion 64 is formed. The holding member 60 has a through hole 65 penetrating between the bottom surface 63a of the recess portion 63 and a bottom surface 64a of the recess portion 64. The sensor rod 52 is inserted through the through hole 65 and the recess portion 64 and inserted into a sensor rod hole (first hole) 32 of the piston rod 30.

An inner diameter of the recess portion 64 in the small-diameter portion 62 is larger than an outer diameter of the sensor rod 52, and a passage through which the working oil flows is formed between the inner peripheral surface of the recess portion 64 and the outer peripheral surface of the sensor rod 52. The small-diameter portion 62 is formed with a through hole 66 extending along a radial direction from a side surface 62b of the small-diameter portion 62 and communicating with the recess portion 64. That is, the recess portion 64 and the through hole 66 constitute a passage 67 extending from the end surface 62a to the side surface 62b of the small-diameter portion 62.

An outer diameter of the small-diameter portion 62 is smaller than an inner diameter of the sensor body hole 17. Therefore, a space between the small-diameter portion 62 and the sensor body hole 17 functions as a part of the anti-rod side chamber 14.

The holding member 60 is fixed in the sensor body hole 17 in a state where the sensor body 51 is pressed onto the bottom of the sensor body hole 17. That is, the holding member 60 limits movement of the sensor body 51 to the axial direction of the cylinder tube 10. Therefore, the sensor body 51 and the sensor rod 52 cannot move with respect to the cylinder tube 10, and a relative position of the piston rod 30 with respect to the cylinder tube 10 can be detected more accurately.

Refer to FIG. 1 again. In this embodiment, the sensor body 51 is fixed to the cylinder bottom 12 by a fastening member 72. By means of the holding member 60 and the fastening member 72, the sensor body 51 can be fixed to the cylinder bottom 12 more reliably.

A wiring 55, which is connected to the sensor body 51, is withdrawn to an outside of the hydraulic cylinder 100 through a wiring hole 19 formed in the cylinder bottom 12.

The sensor rod 52 is movably inserted into the sensor rod hole 32 formed in the piston rod 30. The sensor rod hole 32 opens in a surface 33 faced with the cylinder bottom 12 and extends along the axial direction of the cylinder tube 10.

The annular magnet 53 is disposed in the sensor rod hole 32 in the piston rod 30 so that the sensor rod 52 penetrates the magnet 53. On both sides of the magnet 53 in the axial direction of the piston rod 30, annular spacers 34 and 35 are disposed. The spacers 34 and 35 are fixed to the piston rod 30 so as to hold the magnet 53 with respect to the piston rod 30.

The position sensor 50 sends out an excitation pulse to a magnetostrictive wire in the sensor rod 52 from the sensor body 51. When an external magnetic field of the magnet 53 acts on the excitation pulse, a mechanical distortion pulse is generated in the magnetostrictive wire. The position sensor 50 calculates a distance between the sensor body 51 and the magnet 53 on the basis of time from when the excitation pulse is sent out until the distortion pulse is returned. As a result, the position sensor 50 detects a relative position of the piston rod 30 with respect to the cylinder tube 10, that is, a stroke amount of the hydraulic cylinder 100.

Inner diameters of the sensor rod hole 32, the magnet 53, and the spacers 34 and 35 are larger than the outer diameter of the sensor rod 52. Therefore, a gap is present between the outer peripheral surface of the sensor rod 52 and the inner peripheral surfaces of the sensor rod hole 32, the magnet 53, and the spacers 34 and 35. When this gap is filled with the working oil, abrasion on the piston rod 30 and the sensor rod 52 while the piston rod 30 is moving is prevented.

The spacer 35 has a fitted portion 36 capable of fitting with the holding member 60. The fitted portion 36 is provided on the inner peripheral surface of the sensor rod hole 32 of the piston rod 30. When the hydraulic cylinder 100 is operated, and the piston rod 30 gets close to the cylinder bottom 12, the fitted portion 36 is fitted with the small-diameter portion 62 protruding from the sensor body hole 17 (see FIG. 3). The holding member 60, which is fitted with the fitted portion 36, is held by the piston rod 30 by a friction force with the fitted portion 36.

The friction force between the fitted portion 36 and the holding member 60 is weaker than a force by which the fastening member 71 fixes the holding member 60 to the cylinder bottom 12, and the fitting between the holding member 60 and the fitted portion 36 does not influence the operation of the hydraulic cylinder 100. Thus, when the piston rod 30 moves to the cylinder head side, the holding member 60 is removed from the fitted portion 36 without moving, and only the piston rod 30 moves to the cylinder head 40 side.

The passage 67 of the holding member 60 functions as a communication path which allows the sensor rod hole 32 of the piston rod 30 to communicate with the sensor rod hole 17 of the cylinder bottom 12 when being fitted with the fitted portion 36. Hereinafter, the passage 67 is referred to also as the "communication path 67".

Since the communication path 67 allows the sensor rod hole 32 to communicate with the sensor body hole 17, even when the holding member 60 is fitted with the fitted portion 36, a flow of the working oil from the sensor rod hole 32 to the sensor body hole 17 is not shut off. Therefore, the working oil can be prevented from being sealed in the sensor rod hole 32 of the piston rod 30.

In this embodiment, the spacer 35 has the fitted portion 36, but the piston rod 30 or other members may have the fitted portion 36 provided on the inner peripheral surface of the sensor rod hole 32 of the piston rod 30.

Moreover, the tube 11 and the cylinder bottom 12 may be formed integrally or may be formed as separate bodies.

Subsequently, the operation of the hydraulic cylinder 100 will be described by referring to FIGS. 1 and 3.

First, a case where the working oil is supplied to the rod side chamber 13 of the hydraulic cylinder 100 will be described.

When the working oil is supplied to the rod-side chamber 13 through the head-side supply-discharge passage 41, the piston 20 and the piston rod 30 move to the cylinder bottom 12 side, and the hydraulic cylinder 100 is contracted. At this time, the working oil in the anti-rod side chamber 14 is discharged from the hydraulic cylinder 100 through the bottom-side supply-discharge passage 15.

Figure 3:
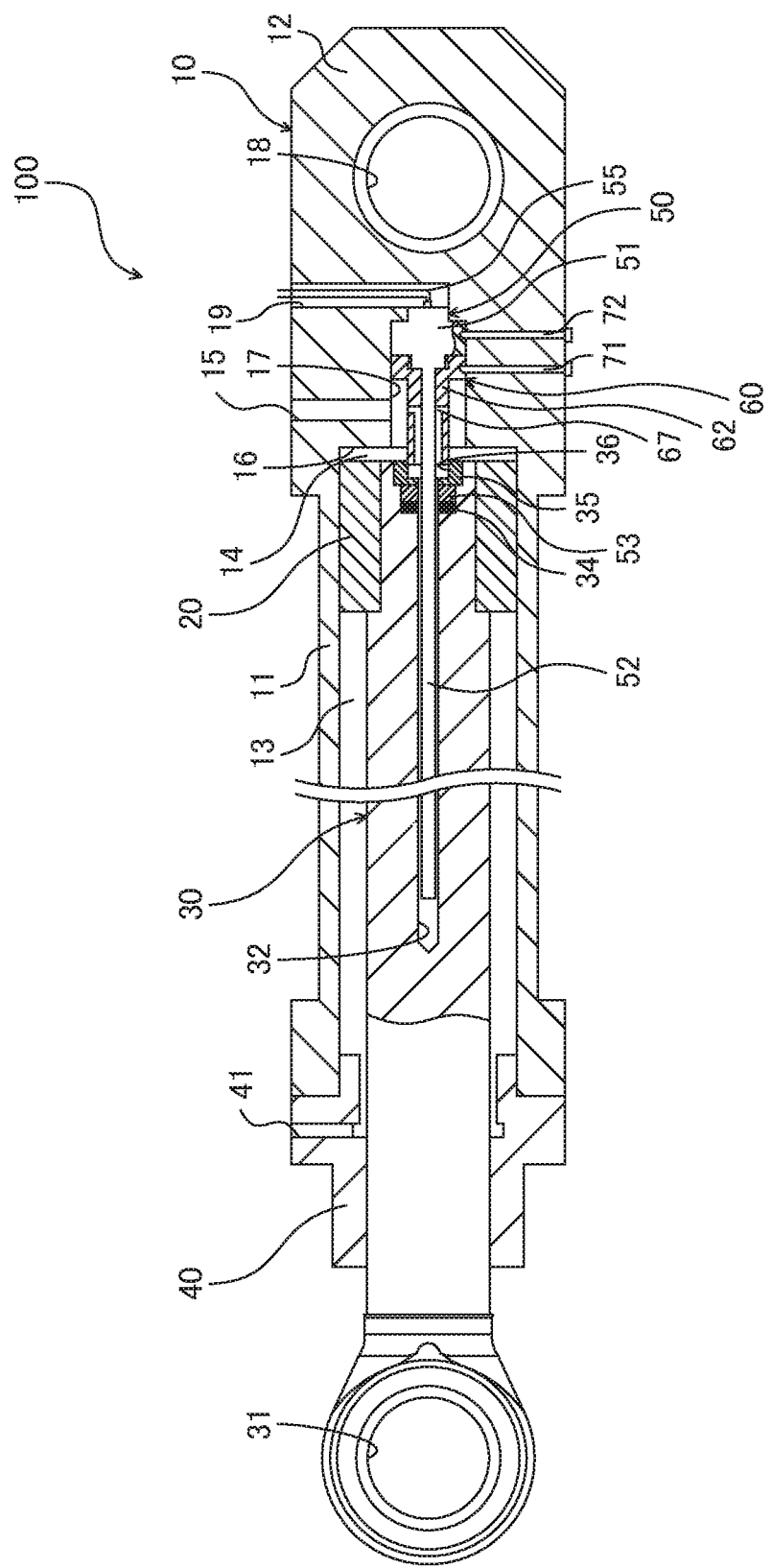
FIG. 3 is a sectional view of the fluid pressure cylinder according to the first embodiment of the present invention and illustrates a state where the holding member is fitted in a fitted portion.

When the piston rod 30 gets closer to the cylinder bottom 12, as illustrated in FIG. 3, the holding member 60 is fitted with the fitted portion 36 of the spacer 35. When the holding member 60 is fitted with the fitted portion 36, the communication path 67 of the holding member 60 allows the sensor rod hole 32 to communicate with the sensor body hole 17 and thus, the working oil in the sensor rod hole 32 in the piston rod 30 is discharged to the sensor body hole 17 through the communication path 67. Therefore, the piston rod 30 can move so as to get further closer to the cylinder bottom 12. The piston rod 30 is stopped when it reaches the limiting surface 16.

Subsequently, a case where the working oil is supplied to the anti-rod side chamber 14 of the hydraulic cylinder 100 will be described. Here, the case where the piston rod 30 is in contact with the limiting surface 16 and the holding member 60 is fitted with the fitted portion 36 is considered.

When the working oil is supplied to the anti-rod side chamber 14 through the bottom-side supply-discharge passage 15, the piston 20 and the piston rod 30 move to the cylinder head 40 side, and the hydraulic cylinder 100 extends. At this time, the working oil in the rod-side chamber 13 is discharged from the hydraulic cylinder 100 through the head-side supply-discharge passage 41.

The friction force between the fitted portion 36 and the holding member 60 is weaker than the force by which the fastening member 71 fixes the holding member 60 to the cylinder bottom 12. Thus, when the piston rod 30 moves to the cylinder head side, the holding member 60 is removed from the fitted portion 36 without moving, and only the piston rod 30 moves to the cylinder head 40 side.

Subsequently, an operation of detecting a relative position of the piston rod 30 with respect to the cylinder tube 10 will be described.

The position sensor 50 sends out an excitation pulse to a magnetostrictive wire in the sensor rod 52 from the sensor body 51, regardless of the operation of the hydraulic cylinder 100. When an external magnetic field of the magnet 53 acts on the excitation pulse, a mechanical distortion pulse is generated in the magnetostrictive wire. The distortion pulse is transmitted to the sensor body 51 through the magnetostrictive wire in the sensor rod 52.

The position sensor 50 calculates a distance between the sensor body 51 and the magnet 53 on the basis of time from when the excitation pulse is sent out from the sensor body

51 until the distortion pulse is returned to the sensor body 51. As a result, the position sensor 50 detects a relative position of the piston rod 30 with respect to the cylinder tube 10, that is, a stroke amount of the hydraulic cylinder 100.

Subsequently, a manufacturing method of the hydraulic cylinder 100 will be described by referring to FIGS. 4 to 6. Here, a case where the piston rod 30 is inserted into the cylinder tube 10 in a state where the piston rod 30 and the cylinder tube 10 are in a laterally placed state (state where the axis of the piston rod 30 and the axis of the cylinder tube 10 match the horizontal direction) will be described as an example.

Figure 4:
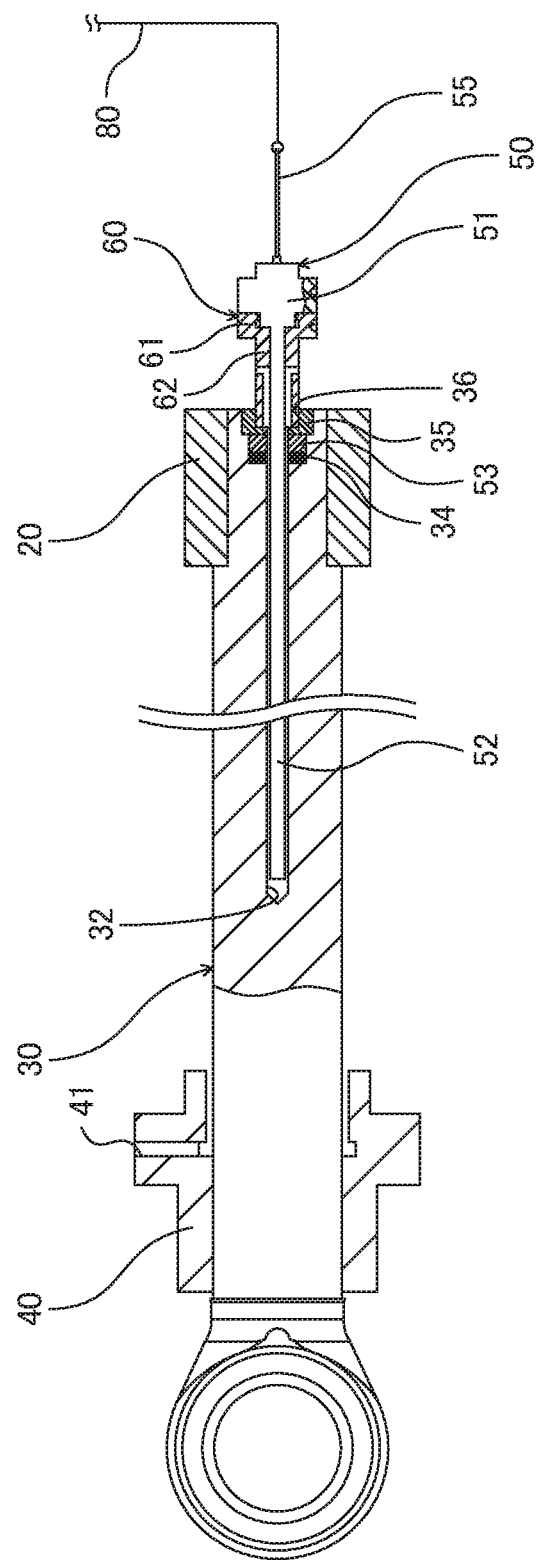
FIG. 4 is a sectional view for explaining a manufacturing method of the fluid pressure cylinder according to the first embodiment of the present invention and illustrates a state before a piston rod is inserted into a cylinder tube.

First, as illustrated in FIG. 4, the piston 20 is mounted on the piston rod 30, and the spacer 34, the magnet 53 and the spacer 35 are disposed in the sensor rod hole 32 of the piston rod 30 in this order. At this time, the spacers 34 and 35 are fixed to the piston rod 30 so that the spacers 34 and 35 hold the magnet 53 with respect to the piston rod 30.

Subsequently, the sensor rod 52, which extends from the sensor body 51, is passed through the large-diameter portion 61 and the small-diameter portion 62 of the holding member 60, and the sensor body 51 is fitted in the large-diameter portion 61. After that, the sensor rod 52 is inserted into the sensor rod hole 32 of the piston rod 30, and the small-diameter portion 62 is fitted with the fitted portion 36 of the spacer 35. As a result, the holding member 60 is mounted on the piston rod 30, and the sensor body 51 is held by the holding member 60 with respect to the piston rod 30.

Since the sensor body 51 is held with respect to the piston rod 30 through the holding member 60, even in the state where the axis of the piston rod 30 matches the horizontal direction, the sensor body 51 is not displaced in a radial direction of the piston rod 30.

Moreover, at this time, the sensor body 51 is held by the holding member 60 mounted on the piston rod 30 with respect to the piston rod 30 in a state where an interval exceeding the predetermined distance D (see FIG. 1) from the piston rod 30 is provided.

When the sensor rod 52 can be removed from the sensor body 51, the sensor body 51 may be mounted on the sensor rod 52 after the sensor rod 52 is inserted into the sensor rod hole 32. In this case, after the sensor rod 52 is passed through the holding member 60, and the small-diameter portion 62 is fitted with the fitted portion 36, the sensor body 51 is fitted in the large-diameter portion 61 and the sensor body 51 is mounted on the sensor rod 52.

When the sensor body 51 is held with respect to the piston rod 30 by the holding member 60 mounted on the piston rod 30, the wiring 55 is tied with a withdrawing jig 80 in a strap state. It may be so configured that the wiring 55 is tied with the withdrawing jig 80 before the sensor body 51 is held by the holding member 60 with respect to the piston rod 30.

Figure 5:
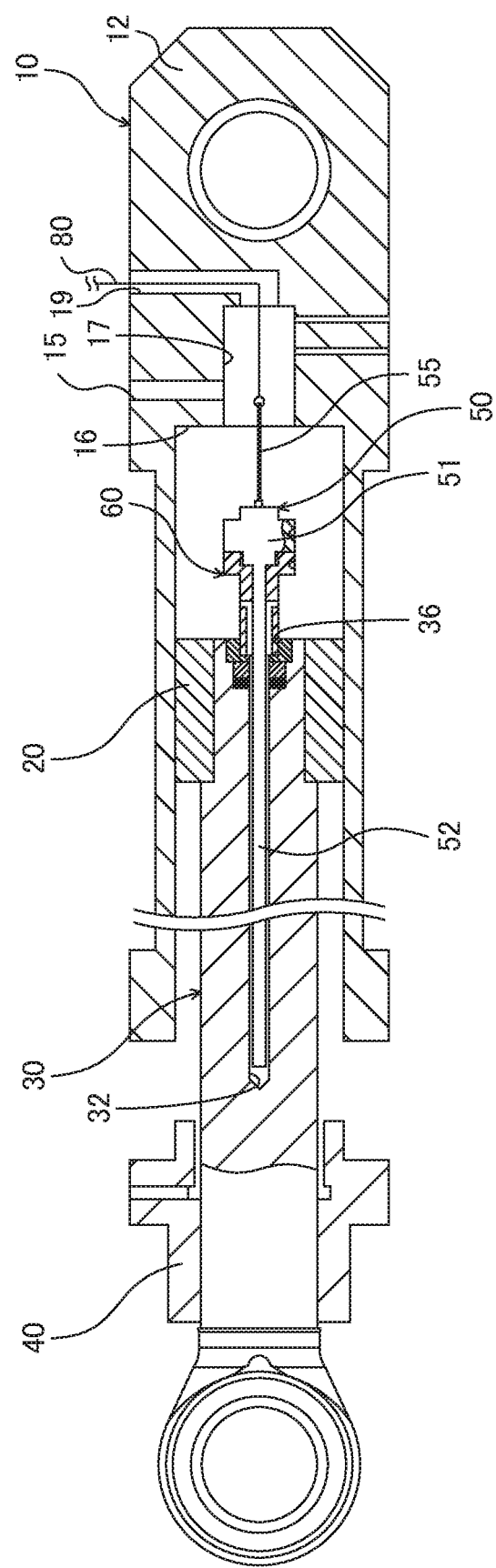
FIG. 5 is a sectional view for explaining the manufacturing method of the fluid pressure cylinder according to the first embodiment of the present invention and illustrates a state in the middle of inserting the piston rod into a cylinder tube.

Subsequently, as illustrated in FIG. 5, the piston rod 30 is inserted into the cylinder tube 10, and the withdrawing jig 80 is withdrawn from the wiring hole 19. Since the sensor body 51 is held by the holding member 60 with respect to the piston rod 30, the sensor body 51 and the sensor rod 52 are inserted into the cylinder tube 10.

Figure 6:
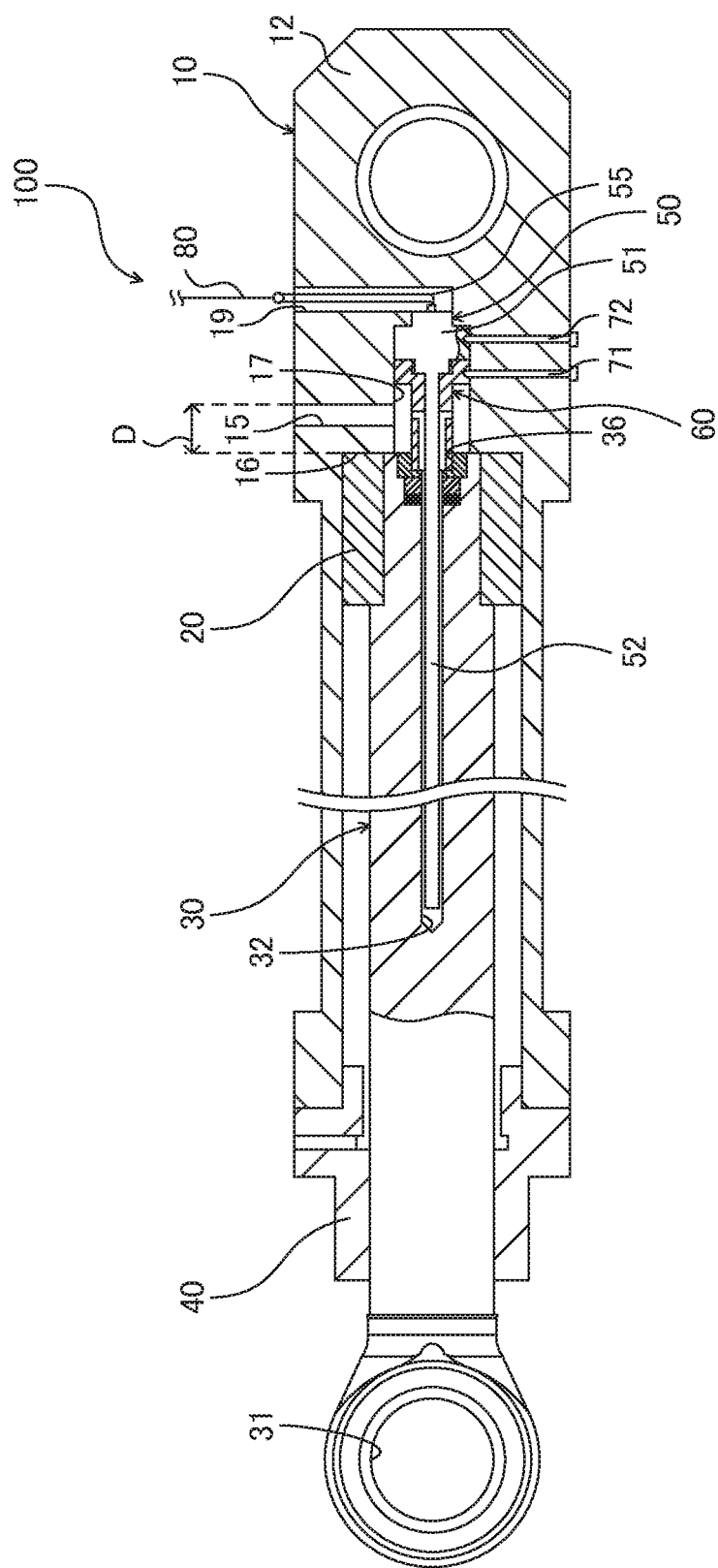
FIG. 6 is a sectional view for explaining the manufacturing method of the fluid pressure cylinder according to the first embodiment of the present invention and illustrates a state after the piston rod is inserted into a cylinder tube.

When the piston rod 30 is pushed in until the piston rod 30 is brought into contact with the limiting surface 16 of the cylinder bottom 12, as illustrated in FIG. 6, the sensor body 51 is fitted in the sensor body hole 17 of the cylinder bottom 12. The wiring 55 is withdrawn from the wiring hole 19 by further withdrawing the withdrawing jig 80 from the wiring hole 19.

The withdrawing jig 80 is not limited to the strap state but may be a rod state, for example.

Since the sensor body 51 is held by the holding member 60 with respect to the piston rod 30, even if the axes of the piston rod 30 and the cylinder tube 10 are horizontal (laterally directed), the sensor body 51 is not displaced in the radial direction of the piston rod. Thus, even if the piston rod 30 is inserted into the cylinder tube 10 when the axes of the piston rod 30 and the cylinder tube 10 are in the horizontal state, the sensor body 51 reaches the sensor body hole 17 and is fitted in the sensor body hole 17.

Naturally, even by inserting the piston rod 30 in the cylinder tube 10 in a state where the axes of the piston rod 30 and the cylinder tube 10 are matched in the vertical direction and inclined with respect to the vertical direction, the sensor body 51 reaches the sensor body hole 17 and is fitted in the sensor body hole 17.

As described above, in this embodiment, the piston rod 30 can be inserted into the cylinder tube 10 without limitation on the directions of the cylinder tube 10 and the piston rod 30.

Moreover, the sensor body 51 has the sensor body 51 held by the holding member 60 mounted on the piston rod 30 with respect to the piston rod 30 with an interval exceeding the predetermined distance D from the piston rod 30 provided. Thus, by pushing in the piston rod 30 until the piston rod 30 is brought into contact with the limiting surface 16, the sensor body 51 is pushed in closer to the bottom side of the sensor body hole 17 than the opening of the bottom-side supply-discharge passage 15. Therefore, manufacture of the hydraulic cylinder 100 in the state where the sensor body 51 closes the bottom-side supply-discharge passage 15 can be prevented.

Subsequently, by fixing the holding member 60 to the cylinder bottom 12 by using the fastening member 71, the sensor body 51 is fixed to the cylinder tube 10. The friction force between the fitted portion 36 and the holding member 60 is weaker than the force by which the fastening member 71 fixes the holding member 60 to the cylinder bottom 12. Thus, by moving the piston rod 30 to the cylinder head 40 side, the fitted portion 36, that is, the piston rod 30 can be removed from the holding member 60.

After that, the sensor body 51 is fixed to the cylinder bottom 12 by using the fastening member 72, and the cylinder head 40 is fitted with the cylinder tube 10. By means of the aforementioned processes, the hydraulic cylinder 100 is completed.

According to the first embodiment described above, the following effects are exerted.

When the piston rod 30 is to be inserted into the cylinder tube 10, the sensor body 51 is held by the holding member 60 mounted on the piston rod 30 with respect to the piston rod 30. Even if the piston rod 30 is inserted into the cylinder tube 10 in the state where the axis of the piston rod 30 is inclined with respect to the vertical direction, the sensor body 51 is not displaced in the radial direction of the piston rod 30. Thus, the sensor body 51 is fitted in the sensor body hole 17. Therefore, the piston rod 30 can be inserted into the cylinder tube 10 without limitation on the directions of the cylinder tube 10 and the piston rod 30.

When the piston rod 30 is to be inserted into the cylinder tube 10, an interval is provided between the piston rod 30 and the sensor body 51. The sensor body 51 is inserted into the cylinder tube 10 in a state separated away from the piston rod 30. Therefore, the sensor body 51 can be pushed into the depth of the cylinder tube 10.

The piston rod 30 is inserted into the cylinder tube 10 in the state where an interval exceeding the predetermined distance D is provided from the sensor body 51. By pushing in the piston rod 30 until the piston rod 30 is brought into contact with the limiting surface 16, the sensor body 51 is pushed in closer to the bottom side of the sensor body hole 17 than the opening of the bottom-side supply-discharge passage 15. Therefore, manufacture of the hydraulic cylinder 100 in the state where the sensor body 51 closes the bottom-side supply-discharge passage 15 can be prevented.

The holding member 60 is fixed to the cylinder tube 10 after the manufacture of the hydraulic cylinder 100 and limits movement of the sensor body 51. That is, the holding member 60 has a function of fixing the position sensor 50 to the cylinder tube 10.

As described above, the holding member 60 has a function of holding the sensor body 51 with respect to the piston rod 30 in manufacture of the hydraulic cylinder 100, a function of pushing in the sensor body 51 to the depth of the cylinder tube 10 in manufacture of the hydraulic cylinder 100, and a function of fixing the position sensor 50 to the cylinder tube 10 after manufacture of the hydraulic cylinder 100.

Moreover, in this embodiment, the communication path 67 allows the sensor body hole 17 of the cylinder tube 10 to communicate with the sensor rod hole 32 of the piston rod 30. Even when the holding member 60 is fitted with the fitted portion 36, a flow of the working oil from the sensor rod hole 32 to the sensor body hole 17 is not shut off. Therefore, the working oil is prevented from being sealed in the sensor rod hole 32 of the piston rod 30.

<Second Embodiment>

Subsequently, by referring to FIGS. 7 to 9, a hydraulic cylinder 200 according to a second embodiment of the present invention will be described. In the following, the same reference numerals are given to the same constitution as the constitution in the first embodiment, and the explanation will be omitted.

Figure 7:
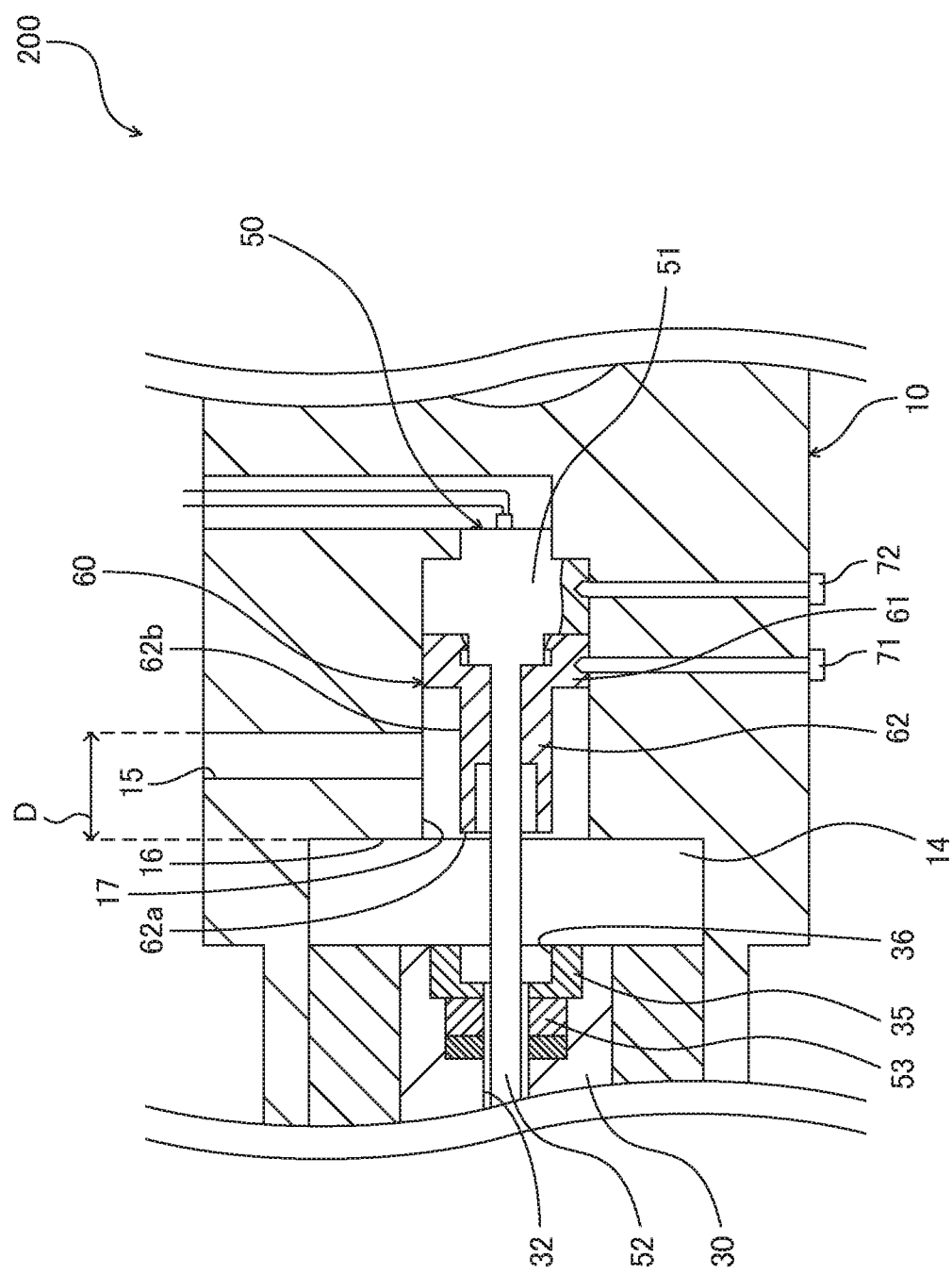
FIG. 7 is an enlarged sectional view illustrating a fluid pressure cylinder according to a second embodiment of the present invention in comparison with FIG. 2.

FIG. 7 is an enlarged sectional view illustrating the hydraulic cylinder 200 according to this embodiment in correspondence with FIG. 2. As illustrated in FIG. 7, the holding member 60 is fixed to the sensor body hole 17 of the cylinder bottom 12, and the position sensor 50 is held in the cylinder tube 10 by the holding member 60.

The small-diameter portion 62 of the holding member 60 is fixed to the cylinder tube 10 so as not to touch the fitted portion 36 of the spacer 35 even in the state where the piston rod 30 has reached the limiting surface 16. That is, the holding member 60 has a gap from the piston rod 30 regardless of the position of the piston rod 30. Thus, even if the hydraulic cylinder 200 is operated and the piston rod 30 gets close to the cylinder bottom 12, the holding member 60 is not fitted with the fitted portion 36. Therefore, the hydraulic cylinder 200 is operated without being influenced by the holding member 60.

Since the holding member 60 is not fitted with the fitted portion 36 when the hydraulic cylinder 200 is being operated, the sensor rod hole 32 of the piston rod 30 is not closed by the holding member 60. Thus, the working oil is not sealed in the sensor rod hole 32 of the piston rod 30. Therefore, the hydraulic cylinder 200 does not require the passage 67 (see FIG. 2) formed in the holding member 60 in the first embodiment.

Since an operation of the hydraulic cylinder 200 is substantially the same as the operation in the first embodiment, the explanation is omitted, here.

Subsequently, a manufacturing method of the hydraulic cylinder 200 will be described by referring to FIGS. 8 and 9. Here, similarly to the first embodiment, the case where the piston rod 30 is inserted into the cylinder tube 10 in the state where the piston rod 30 and the cylinder tube 10 are directed laterally will be described as an example.

First, similarly to the first embodiment, the sensor body 51 is fitted in the large-diameter portion 61 of the holding member 60, and the small-diameter portion 62 of the holding member 60 is fitted in the fitting portion 36 of the spacer 35 (see FIG. 4). As a result, the holding member 60 is mounted on the piston rod 30, and the sensor body 51 is held by the holding member 60 with respect to the piston rod 30.

At this time, the large-diameter portion 61 of the holding member 60 is separated by a predetermined distance D (see FIG. 7) or more from the piston rod 30 by the small-diameter portion 62 of the holding member 60.

Figure 8:
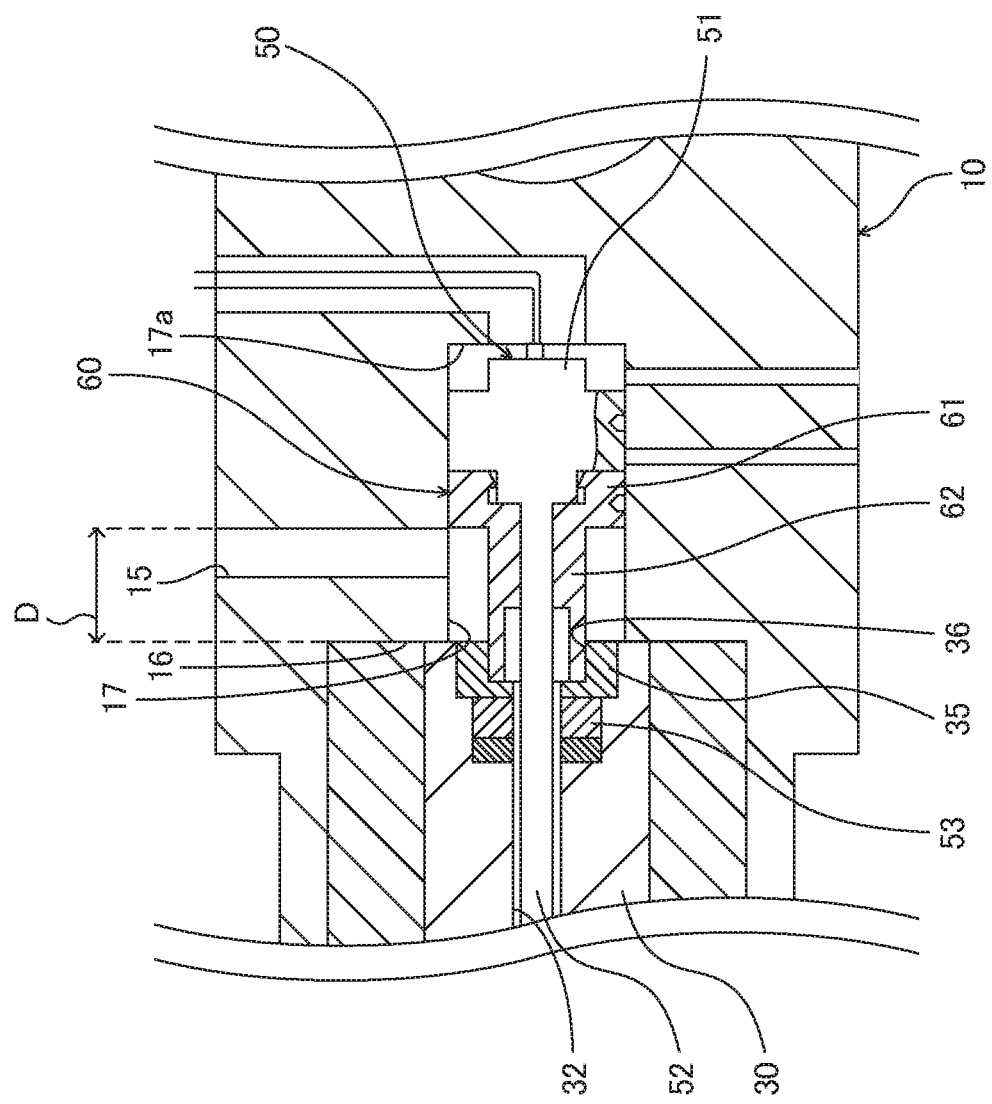
FIG. 8 is an enlarged sectional view for explaining the manufacturing method of the fluid pressure cylinder according to the second embodiment of the present invention and illustrates a state after the piston rod is inserted into a cylinder tube.
Figure 9:
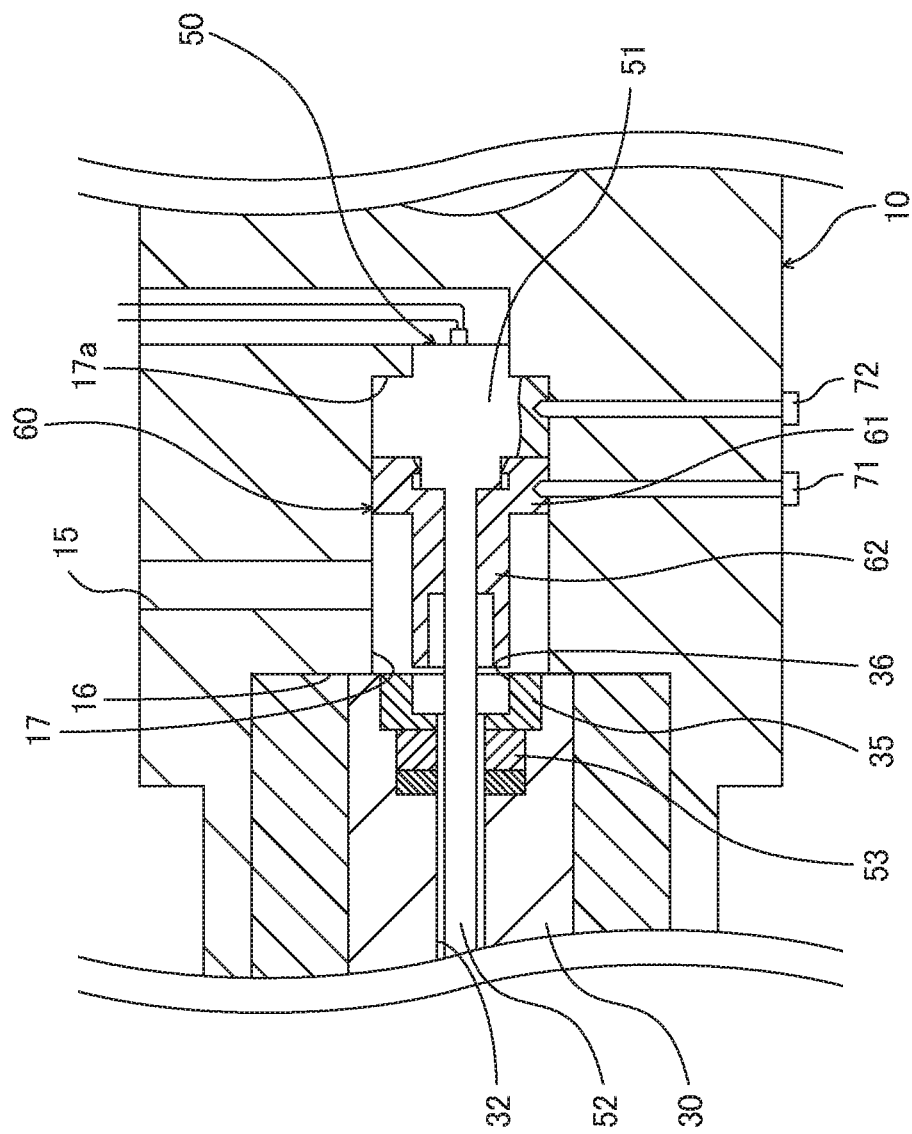
FIG. 9 is an enlarged sectional view for explaining the manufacturing method of the fluid pressure cylinder according to the second embodiment of the present invention and illustrates a state after a holding member is removed from the piston rod.

Subsequently, as illustrated in FIG. 8, the piston rod 30 is inserted into the cylinder tube 10, and the piston rod 30 is pushed in until the piston rod 30 is brought into contact with the limiting surface 16 of the cylinder bottom 12. Since the sensor body 51 is held by the holding member 60 with respect to the piston rod 30, even if the axes of the piston rod 30 and the cylinder tube 10 are horizontal (laterally directed), the sensor body 51 is not displaced in the radial direction of the piston rod. Thus, the sensor body 51 is inserted into the sensor body hole 17 of the cylinder tube 10.

Since the large-diameter portion 61 of the holding member 60 is separated from the piston rod 30 by the predetermined distance D or more, it is pushed in closer to the bottom side of the sensor body hole 17 than the opening of the bottom-side supply-discharge passage 15. At this time, the sensor body 51 is not pushed into the bottom of the sensor body hole 17 but has a gap from the bottom surface 17a of the sensor body hole 17.

Subsequently, air is supplied to the sensor body hole 17 through the bottom-side supply-discharge passage 15, and a pneumatic pressure is made to act on the holding member 60. Since the large-diameter portion 61 of the holding member 60 is located closer to the bottom side of the sensor body hole 17 than the opening of the bottom-side supply-discharge passage 15, the holding member 60 is moved to the bottom side of the sensor body hole 17 (insertion direction of the piston rod 30 into the cylinder tube 10) by the pneumatic pressure. As a result, the holding member 60 goes out of the fitted portion 36, and the sensor body 51 is pushed into the bottom surface 17a of the sensor body hole 17 (see FIG. 9).

In this embodiment, the holding member 60 is removed from the piston rod 30 by using the pneumatic pressure, but a pressure of fluids other than air may be used. Moreover, by separately preparing a jig for moving the holding member to the insertion direction, the holding member 60 may be removed from the piston rod 30 by using this jig.

When the holding member 60 is to be removed from the piston rod 30, by providing a structure (a hole, for example) separately from the bottom-side supply-discharge passage 15 on the cylinder tube 10, and this structure may be used, but use of the bottom-side supply-discharge passage 15 is more preferable. By using the bottom-side supply-discharge passage 15, there is no need to provide a structure for moving the holding member 60 on the hydraulic cylinder 200 separately from the bottom-side supply-discharge passage 15. Therefore, the structure of the fluid pressure cylinder can be further simplified.

After the holding member 60 is removed from the fitted portion 36, the holding member 60 is fixed to the cylinder bottom 12 by using the fastening member 71, and the sensor body 51 is fixed to the cylinder bottom 12 by using the fastening member 72. By fitting the cylinder head 40 with the cylinder tube 10, the hydraulic cylinder 200 is completed.

According to the second embodiment described above, in addition to the effect exerted by the first embodiment, the following effects are exerted.

Since the holding member 60 is moved in the insertion direction with respect to the piston rod 30 when it is removed from the piston rod 30, it does not touch the piston rod 30 regardless of the position of the piston rod 30 after it is fixed to the cylinder tube 10. Therefore, an influence on the operation of the hydraulic cylinder 200 by the holding member 60 can be eliminated.

The holding member 60 is moved upon receipt of a pressure through the bottom-side supply-discharge passage 15 for supplying or discharging the working oil with respect to the sensor body hole 17. Thus, a structure used for removing the holding member 60 from the piston rod 30 does not have to be separately provided on the hydraulic cylinder 200. Therefore, the structure of the hydraulic cylinder 200 can be further simplified.

The constitutions, operations, and effects of the embodiments of the present invention will be described below.

This embodiment relates to the manufacturing method of the hydraulic cylinders 100 and 200 including the position sensor 50 configured to detect the relative position of the piston rod 30 with respect to the cylinder tube 10, and the position sensor 50 has the sensor body 51 and the sensor rod 52 extending from the sensor body 51. The manufacturing method of the hydraulic cylinders 100 and 200 includes a process of inserting the sensor rod 52 into the sensor rod hole 32 extending in the piston rod 30 along the axial direction of the piston rod 30, a process of holding the sensor body 51 with respect to the piston rod 30 by using the holding member 60 mounted on the piston rod 30, a process of inserting the piston rod 30 with the sensor body 51 into the cylinder tube 10, and a process of fixing the sensor body 51 to the cylinder tube 10 by fixing the holding member 60 to the cylinder tube 10.

In this constitution, when the piston rod 30 is to be inserted into the cylinder tube 10, the sensor body 51 is held by the holding member 60 mounted on the piston rod 30 with respect to the piston rod 30. Even if the piston rod 30 is inserted into the cylinder tube 10 in the state where the axis of the piston rod 30 is inclined with respect to the vertical direction, the sensor body 51 is not displaced in the radial direction of the piston rod 30, and the sensor body 51 reaches the sensor body hole 17 of the cylinder tube 10. Therefore, the piston rod 30 can be inserted into the cylinder tube 10 without limitation on the directions of the cylinder tube 10 and the piston rod 30.

Moreover, in this embodiment, the manufacturing method of the hydraulic cylinders 100 and 200 includes removing the piston rod 30 from the holding member 60 after fixing the holding member 60 to the cylinder tube 10.

In this constitution, since the piston rod 30 is removed from the holding member 60 after the holding member 60 is fixed to the cylinder tube 10, the holding member 60 is in a state mounted on the piston rod 30 until it is fixed to the cylinder tube 10. Therefore, the sensor body 51 can be pushed into the predetermined position only by pushing in the piston rod 30.

Moreover, in this embodiment, the manufacturing method of the hydraulic cylinder 200 includes removing the holding member 60 from the piston rod 30 by moving the holding member 60 with respect to the piston rod 30 in the insertion direction of the piston rod 30 into the cylinder tube 10, and after that, fixing the holding member 60 to the cylinder tube 10.

In this constitution, since the holding member 60 moves in the insertion direction with respect to the piston rod 30 when it is removed from the piston rod 30, after it is fixed to the cylinder tube 10, it does not touch the piston rod 30 regardless of the position of the piston rod 30. Therefore, an influence on the operation of the hydraulic cylinder 200 by the holding member 60 can be eliminated.

Moreover, in this embodiment, the manufacturing method of the hydraulic cylinder 200 includes moving the holding member 60 in the insertion direction with respect to the piston rod 30 by having a pneumatic pressure act on the holding member 60 through the bottom-side supply-discharge passage 15 provided on the cylinder tube 10 and configured to supply or discharge the working oil.

In this constitution, since the holding member 60 moves upon receipt of the pneumatic pressure through the bottom-side supply-discharge passage 15 for supplying or discharging the working oil, there is no need to separately provide a structure for removing the holding member 60 from the piston rod 30 on the hydraulic cylinder 200. Therefore, the structure of the hydraulic cylinder 200 can be further simplified.

Moreover, in this embodiment, the manufacturing method of the hydraulic cylinder 100 includes holding the sensor body 51 with respect to the piston rod 30 with an interval between the piston rod 30 and the sensor body 51 by using the holding member 60 mounted on the piston rod 30.

In this constitution, when the piston rod 30 is to be inserted into the cylinder tube 10, the interval is provided between the piston rod 30 and the sensor body 51. The sensor body 51 is inserted into the cylinder tube 10 in the state separated away from the piston rod 30. Therefore, the sensor body 51 can be pushed into the depth of the cylinder tube 10.

Moreover, in this embodiment, the hydraulic cylinders 100 and 200 include the cylinder tube 10, the piston rod 30 movably inserted into the cylinder tube 10, the position sensor 50 configured to detect the relative position of the piston rod 30 with respect to the cylinder tube 10, and the holding member 60 fixed to the cylinder tube 10, the holding member 60 being configured to hold the position sensor 50 in the cylinder tube 10, wherein the piston rod 30 has the sensor rod hole 32 extending in the axial direction of the piston rod 30, the position sensor 50 has the sensor body 51 fixed to the cylinder tube 10 by the holding member 60 and the sensor rod 52 extending in the axial direction of the cylinder tube 10 from the sensor body 51 and movably inserted into the sensor rod hole 32 of the piston rod 30, and in assembling of the hydraulic cylinders 100 and 200, the piston rod 30 is inserted into the cylinder tube 10 in the state where the sensor body 51 is held with respect to the piston rod 30 by the holding member 60 mounted on the piston rod 30.

In this constitution, the piston rod 30 is inserted into the cylinder tube 10 in the state where the sensor body 51 is held by the holding member 60 mounted on the piston rod 30 with respect to the piston rod 30. Even if the piston rod 30 is inserted into the cylinder tube 10 in the state where the axis of the piston rod 30 is inclined with respect to the vertical direction, the sensor body 51 is not displaced in the radial direction of the piston rod 30, and the sensor body 51 reaches the sensor body hole 17 of the cylinder tube 10. Therefore, the piston rod 30 can be inserted into the cylinder tube 10 without limitation on the directions of the cylinder tube 10 and the piston rod 30.

Moreover, in this embodiment, in the hydraulic cylinders 100 and 200, the cylinder tube 10 has the limiting surface 16 configured to limit movement of the piston rod 30 to the axial direction of the cylinder tube 10, the sensor body hole 17 extending in the axial direction of the cylinder tube 10 from the limiting surface 16 and in which the sensor body 51 is fitted, and the bottom-side supply-discharge passage 15 opening in the inner peripheral surface of the sensor body hole 17, the bottom-side supply-discharge passage 15 being configured to supply or discharge the working oil with respect to the sensor body hole 17, the opening of the bottom-side supply-discharge passage 15 located on the inner peripheral surface of the sensor body hole 17 is separated away from the limiting surface 16 only by the predetermined distance D in the axial direction of the cylinder tube 10, and the holding member 60 is configured to hold the sensor body 51 with respect to the piston rod 30 by providing the interval exceeding the predetermined distance D between the piston rod 30 and the sensor body 51 when the piston rod 30 is inserted into the cylinder tube 10.

In this constitution, the piston rod 30 is inserted into the cylinder tube 10 in the state where the interval exceeding the predetermined distance D is provided between the piston rod 30 and the sensor body 51. Thus, by pushing in the piston rod 30 to the limiting surface 16, the sensor body 51 is pushed in closer to the bottom side of the sensor body hole 17 than the opening of the bottom-side supply-discharge passage 15. Therefore, manufacture of the hydraulic cylinders 100 and 200 in the state where the sensor body 51 closes the bottom-side supply-discharge passage 15 can be prevented.

Moreover, in the hydraulic cylinder 100 of this embodiment, the piston rod 30 has the fitted portion 36 provided on the inner peripheral surface of the sensor rod hole 32, the fitted portion 36 being configured to fit with the holding member 60 when the piston rod 30 gets close to the limiting surface 16, and the holding member 60 has the communication path 67 configured to allow the sensor rod hole 32 to communicate with the sensor body hole 17 when fitting with the fitted portion 36.

In this constitution, the communication path 67 allows the sensor body hole 17 of the cylinder tube 10 to communicate with the sensor rod hole 32 of the piston rod 30. Even when the holding member 60 is fitted with the fitted portion 36, the flow of the working oil from the sensor rod hole 32 to the sensor body hole 17 is not shut off. Therefore, the working oil is prevented from being sealed in the sensor rod hole 32 of the piston rod 30.

Moreover, in the hydraulic cylinder 200 of this embodiment, the holding member 60 has a gap from the piston rod 30 regardless of the position of the piston rod 30.

In this constitution, the holding member 60 has a gap from the piston rod 30. Even if the piston rod 30 is moved during the operation of the hydraulic cylinder 200, the holding member 60 does not touch the piston rod 30. Therefore, an influence on the operation of the hydraulic cylinder 200 by the holding member 60 can be eliminated.

Embodiments of this invention were described above, but the above embodiments are merely examples of applications of this invention, and the technical scope of this invention is not limited to the specific constitutions of the above embodiments.

This application claims priority based on Japanese Patent Application No. 2015-133752 filed with the Japan Patent Office on Jul. 2, 2015, the entire contents of which are incorporated into this specification.

The invention claimed is:

1. A manufacturing method of a fluid pressure cylinder including a position sensor configured to detect a relative position of a piston rod with respect to a cylinder tube, the position sensor having a sensor body and a sensor rod extending from the sensor body, comprising:
   inserting the sensor rod into a rod hole extending in the piston rod along an axial direction of the piston rod;
   holding the sensor body with respect to the piston rod by using a holding member mounted on the piston rod;
   inserting the piston rod with the sensor body into the cylinder tube; and
   fixing the sensor body to the cylinder tube by fixing the holding member to the cylinder tube.

2. The manufacturing method of a fluid pressure cylinder according to claim 1, comprising
   removing the piston rod from the holding member after fixing the holding member to the cylinder tube.

3. The manufacturing method of a fluid pressure cylinder according to claim 1, comprising
   removing the holding member from the piston rod by moving the holding member with respect to the piston rod in an insertion direction of the piston rod into the cylinder tube and then, fixing the holding member to the cylinder tube.

4. The manufacturing method of a fluid pressure cylinder according to claim 3, comprising providing
   a gap between the holding member and the piston rod by removing the holding member from the piston rod.

5. The manufacturing method of a fluid pressure cylinder according to claim 3, comprising
   moving the holding member in the insertion direction with respect to the piston rod by making a fluid pressure to act on the holding member through a supply-discharge passage provided in the cylinder tube.

6. The manufacturing method of a fluid pressure cylinder according to claim 1, comprising
   holding the sensor body with respect to the piston rod with an interval between the piston rod and the sensor body by using the holding member mounted on the piston rod.

7. The manufacturing method of a fluid pressure cylinder according to claim 1, wherein:
   the cylinder tube has:
      a limiting surface configured to limit movement of the piston rod in the axial direction;
      a tube hole extending in the axial direction from the limiting surface; and
      a supply-discharge passage having an opening formed in an inner peripheral surface of the tube hole; wherein
   the opening of the supply-discharge passage is separated from the limiting surface by a predetermined distance in the axial direction; and
   the manufacturing method further comprises:
   providing an interval exceeding the predetermined distance between the piston rod and the sensor body when the sensor body is held with respect to the piston rod; and
   fitting the sensor body in the tube hole by inserting the piston rod into the cylinder tube until the movement of the piston rod is limited by the limiting surface.

8. The manufacturing method of a fluid pressure cylinder according to claim 7, further comprising:

allowing the rod hole to communicate with the tube hole through a communication path formed in the holding member when the movement of the piston rod is limited by the limiting surface.

9. The manufacturing method of a fluid pressure cylinder according to claim 1, further comprising mounting the sensor body on the holding member, the holding member being formed separately from the sensor body.

10. The manufacturing method of a fluid pressure cylinder according to claim 1, further comprising fixing the holding member to the cylinder tube by using a fastening member.

11. A fluid pressure cylinder, comprising:
a cylinder tube;
a piston rod movably inserted into the cylinder tube;
a position sensor configured to detect a relative position of the piston rod with respect to the cylinder tube; and
a holding member fixed to the cylinder tube, the holding member being configured to hold the position sensor in the cylinder tube, wherein:
the cylinder tube has:
   a limiting surface configured to limit movement of the piston rod in an axial direction of the piston rod;
   a tube hole extending in the axial direction from the limiting surface; and
   a supply-discharge passage configured to supply or discharge a working fluid with respect to a fluid chamber between the limiting surface and the piston rod;
the position sensor has:
   a sensor body fixed in the tube hole; and
   a sensor rod extending in the axial direction from the sensor body;
the piston rod is formed with a rod hole into which the sensor rod is movably inserted; and
the holding member is configured to be fitted in the rod hole and to allow the rod hole to communicate with the tube hole when the piston rod gets close to the limiting surface.

* * * * *